US011912422B2

(12) United States Patent
Thomassin et al.

(10) Patent No.: US 11,912,422 B2
(45) Date of Patent: Feb. 27, 2024

(54) HYBRID ELECTRIC AIRCRAFT AND POWERPLANT ARRANGEMENTS

(71) Applicants: Pratt & Whitney Canada Corp., Longueuil (CA); Hamilton Sundstrand Corporation, Charlotte, NC (US)

(72) Inventors: Jean Thomassin, Ste Julie (CA); Todd A. Spierling, Rockford, IL (US)

(73) Assignees: HAMILTON SUNDSTRAND CORPORATION, Charlotte, NC (US); PRATT & WHITNEY CANADA CORP., Longueuil (CA)

( * ) Notice: Subject to any disclaimer, the term of this patent is extended or adjusted under 35 U.S.C. 154(b) by 265 days.

(21) Appl. No.: 16/998,881

(22) Filed: Aug. 20, 2020

(65) Prior Publication Data

US 2021/0061481 A1 Mar. 4, 2021

Related U.S. Application Data

(60) Provisional application No. 62/891,827, filed on Aug. 26, 2019.

(51) Int. Cl.

| | |
|---|---|
| ***B64D 27/24*** | (2006.01) |
| ***B64D 27/12*** | (2006.01) |
| ***B64D 27/02*** | (2006.01) |

(52) U.S. Cl.

CPC ............ *B64D 27/24* (2013.01); *B64D 27/12* (2013.01); *B64D 2027/026* (2013.01)

(58) Field of Classification Search

CPC ........ B64D 27/24; B64D 27/12; B64D 27/02; B64D 27/04; B64D 27/06; B64D 27/18; B64D 2027/026; B64D 31/02

See application file for complete search history.

(56) References Cited

U.S. PATENT DOCUMENTS

| | | | |
|---|---|---|---|
| 6,703,747 B2 | 3/2004 | Kawamura | |
| 8,532,961 B2 | 9/2013 | Guo | |
| 9,174,741 B2 | 11/2015 | Suntharalingam et al. | |
| 10,145,291 B1 | 12/2018 | Thomassin et al. | |
| 10,494,117 B2 | 12/2019 | Bosma | |
| 2005/0237766 A1 | 10/2005 | Klettke | |
| 2006/0254255 A1* | 11/2006 | Okai | B64D 27/24 60/269 |
| 2008/0017426 A1 | 1/2008 | Walters et al. | |
| 2008/0078876 A1 | 4/2008 | Baggette et al. | |
| 2008/0141921 A1 | 6/2008 | Hinderks | |
| 2010/0251692 A1 | 10/2010 | Kinde, Sr. | |

(Continued)

*Primary Examiner* — Joshua J Michener

*Assistant Examiner* — Arfan Y. Sinaki

(74) *Attorney, Agent, or Firm* — Getz Balich LLC

(57) ABSTRACT

A hybrid electric aircraft powerplant arrangement can include a first wing pair of powerplants for a first wing of an aircraft, the first wing pair comprising a first electric powerplant configured to drive a first air mover and a first heat engine powerplant configured to drive a second air mover separate from the first air mover. The arrangement can include a second wing pair of powerplants for a second wing of the aircraft, the second wing pair comprising a second electric powerplant configured to drive a third air mover separate from the first and second air movers, and a second heat engine powerplant configured to drive a fourth air mover separate from the first, second, and third air movers.

20 Claims, 3 Drawing Sheets

(56) References Cited

U.S. PATENT DOCUMENTS

| | | | | |
|---|---|---|---|---|
| 2010/0270417 | A1 | 10/2010 | Goldshteyn | |
| 2011/0024555 | A1 | 2/2011 | Kuhn, Jr. | |
| 2011/0049293 | A1 | 3/2011 | Koletzko | |
| 2012/0012692 | A1 | 1/2012 | Kroo | |
| 2012/0111994 | A1 | 5/2012 | Kummer et al. | |
| 2012/0227389 | A1 | 9/2012 | Hinderks | |
| 2013/0020429 | A1 | 1/2013 | Kroo | |
| 2013/0068876 | A1 | 3/2013 | Radu | |
| 2013/0094963 | A1* | 4/2013 | Rolt | B64D 27/02 416/31 |
| 2013/0157017 | A1 | 6/2013 | Guillemaut et al. | |
| 2014/0180507 | A1 | 6/2014 | Geay et al. | |
| 2015/0183518 | A1 | 7/2015 | Stuckl et al. | |
| 2015/0210407 | A1 | 7/2015 | Griffin et al. | |
| 2015/0321752 | A1 | 11/2015 | Trull et al. | |
| 2016/0023747 | A1 | 1/2016 | Kempshall | |
| 2016/0144957 | A1 | 5/2016 | Claridge et al. | |
| 2016/0221680 | A1 | 8/2016 | Burton et al. | |
| 2016/0272310 | A1 | 9/2016 | Chan et al. | |
| 2016/0304199 | A1 | 10/2016 | Chan et al. | |
| 2016/0347446 | A1 | 12/2016 | Vetter et al. | |
| 2016/0355272 | A1 | 12/2016 | Moxon | |
| 2017/0320585 | A1 | 11/2017 | Armstrong et al. | |
| 2017/0341725 | A1 | 11/2017 | Skahan | |
| 2018/0044028 | A1* | 2/2018 | Takami | F02C 7/20 |
| 2018/0127103 | A1 | 5/2018 | Cantemir | |
| 2018/0141655 | A1 | 5/2018 | Wall | |
| 2018/0208305 | A1 | 7/2018 | Lloyd et al. | |
| 2018/0215462 | A1 | 8/2018 | Fenny et al. | |
| 2018/0230844 | A1* | 8/2018 | Vondrell | F01D 15/10 |
| 2018/0362169 | A1* | 12/2018 | Du | B64C 39/06 |

* cited by examiner

HYBRID ELECTRIC AIRCRAFT AND POWERPLANT ARRANGEMENTS

CROSS-REFERENCE TO RELATED APPLICATIONS

This application claims priority to and the benefit of U.S. Provisional Application No. 62/891,827, filed Aug. 26, 2019, the entire contents of which are herein incorporated by reference in their entirety.

FIELD

This disclosure relates to hybrid electric aircraft, e.g., having four or more engines.

BACKGROUND

A subset of the small regional (about 50 passenger) aircraft market uses four engines, which may be either turboprops (e.g., deHaviland DHC-7) or turbofans (e.g., BAe 146). While this configuration provides good redundancy and takeoff performance, gas turbine engines in this size class have poor fuel economy compared to larger variants.

Such conventional methods and systems have generally been considered satisfactory for their intended purpose. However, there is still a need in the art for improved aircraft and powerplant arrangements. The present disclosure provides a solution for this need.

SUMMARY

A hybrid electric aircraft powerplant arrangement can include a first wing pair of powerplants for a first wing of an aircraft, the first wing pair comprising a first electric powerplant configured to drive a first air mover and a first heat engine powerplant configured to drive a second air mover separate from the first air mover. The arrangement can include a second wing pair of powerplants for a second wing of the aircraft, the second wing pair comprising a second electric powerplant configured to drive a third air mover separate from the first and second air movers, and a second heat engine powerplant configured to drive a fourth air mover separate from the first, second, and third air movers.

The first electric powerplant can be inboard of the first heat engine powerplant. The second electric powerplant can also be inboard of the second heat engine powerplant. Any other suitable relative position is contemplated herein.

The arrangement can include a common controller configured to operate each of the powerplants. In certain embodiments, the first heat engine powerplant and the second heat engine powerplant can be sized to provide full power from take-off through cruise until descent. In certain embodiments, the common controller can be configured to control the first heat engine powerplant and the second heat engine powerplant to operate at only full power, idle power, and a single power setting between full power and idle power. Any other suitable number of power settings (e.g., a plurality of discrete power settings) between full power and idle power is contemplated herein.

The arrangement can further include the first, second, third, and fourth air movers. Each of the air movers can be a propeller, a fan, or similar devices, for example.

In certain embodiments, the first electric powerplant and the second electric powerplant can be powered by one or more electrical energy sources (e.g., one or more batteries) that are separate from the first and second heat engine powerplants. The first heat engine powerplant and/or the second heat engine powerplant can be configured to provide electrical energy to the one or more electrical energy sources (e.g., to charge the one or more batteries). In certain embodiments, it is contemplated that the first and second heat engine powerplants may not be connected to provide any electrical power to the electrical energy source.

In accordance with this disclosure, a hybrid electric aircraft can include a first wing and a second wing (e.g., attached to a fuselage). The aircraft can include a first wing pair of powerplants, e.g., as described above, attached to the first wing, and a second wing pair of powerplants, e.g., as described above, attached to the second wing of the aircraft. The aircraft can include any other suitable components.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
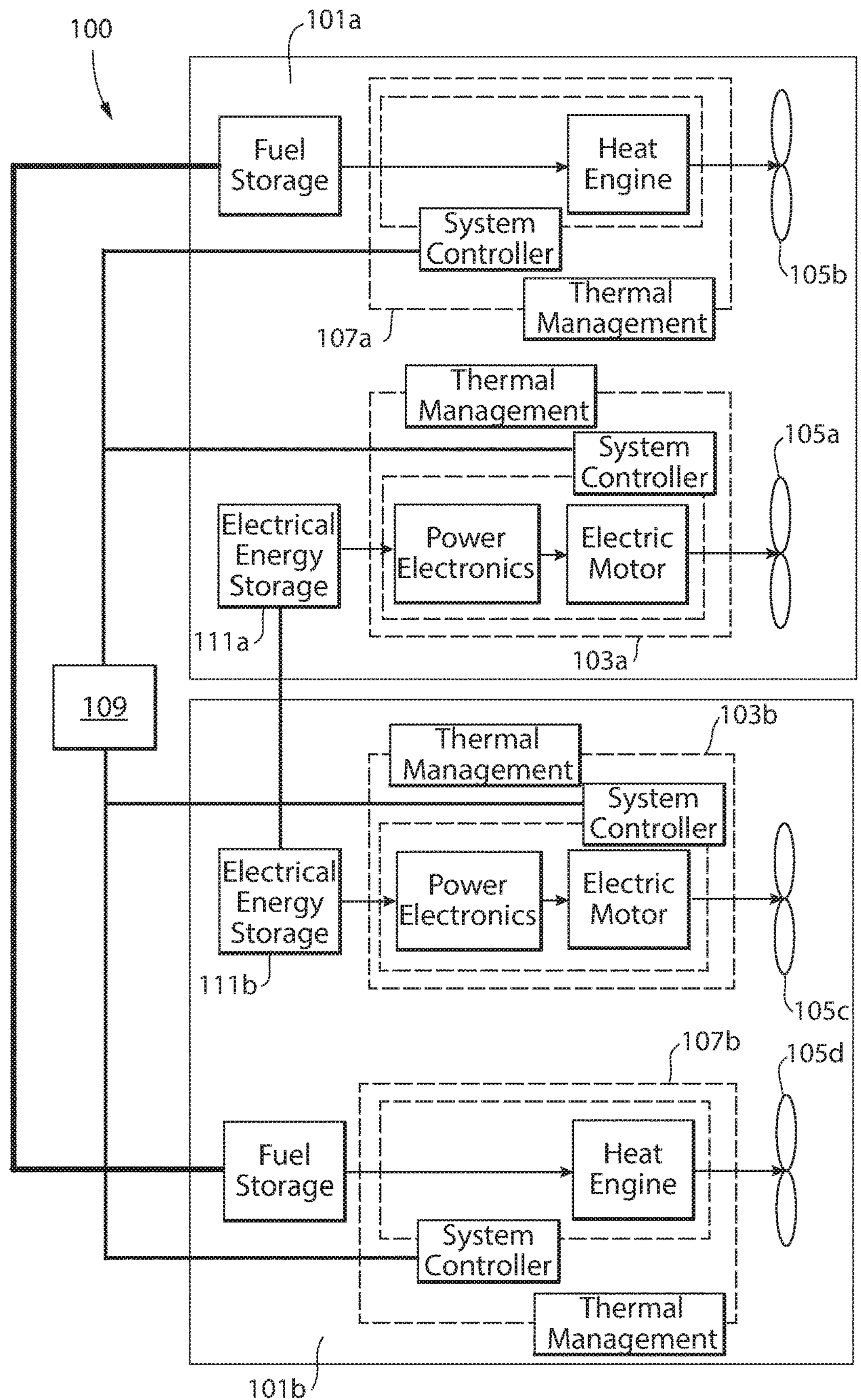
FIG. 1 is a plan schematic diagram of an embodiment of a powerplant arrangement in accordance with this disclosure.

Reference will now be made to the drawings wherein like reference numerals identify similar structural features or aspects of the subject disclosure. For purposes of explanation and illustration, and not limitation, an illustrative view of an embodiment of an arrangement in accordance with the disclosure is shown in FIG. 1 and is designated generally by reference character 100. Other embodiments and/or aspects of this disclosure are shown in FIGS. 2 and 3.

Figure 2:
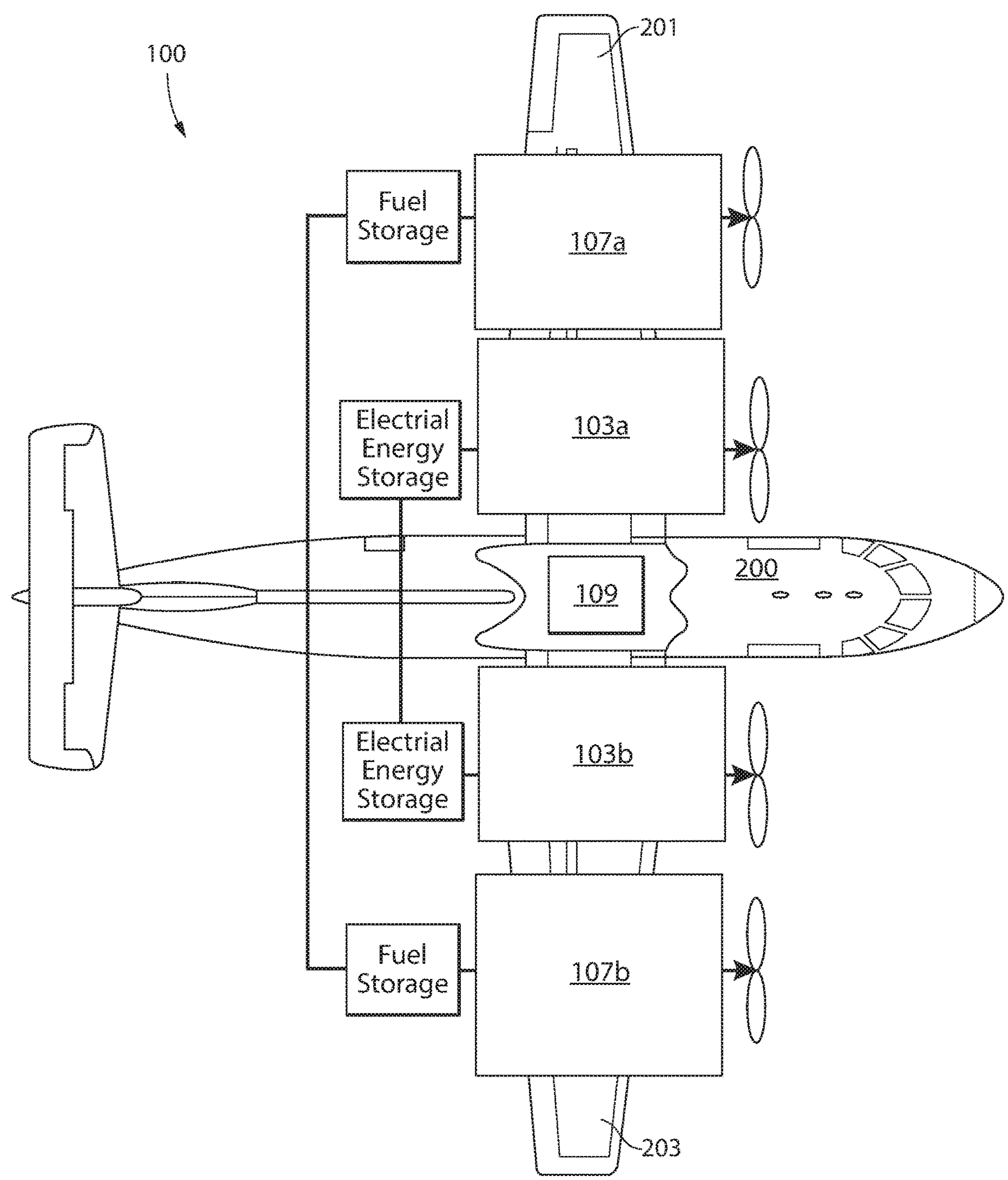
FIG. 2 is a plan schematic view of an embodiment of an aircraft in accordance with this disclosure.
Figure 3:
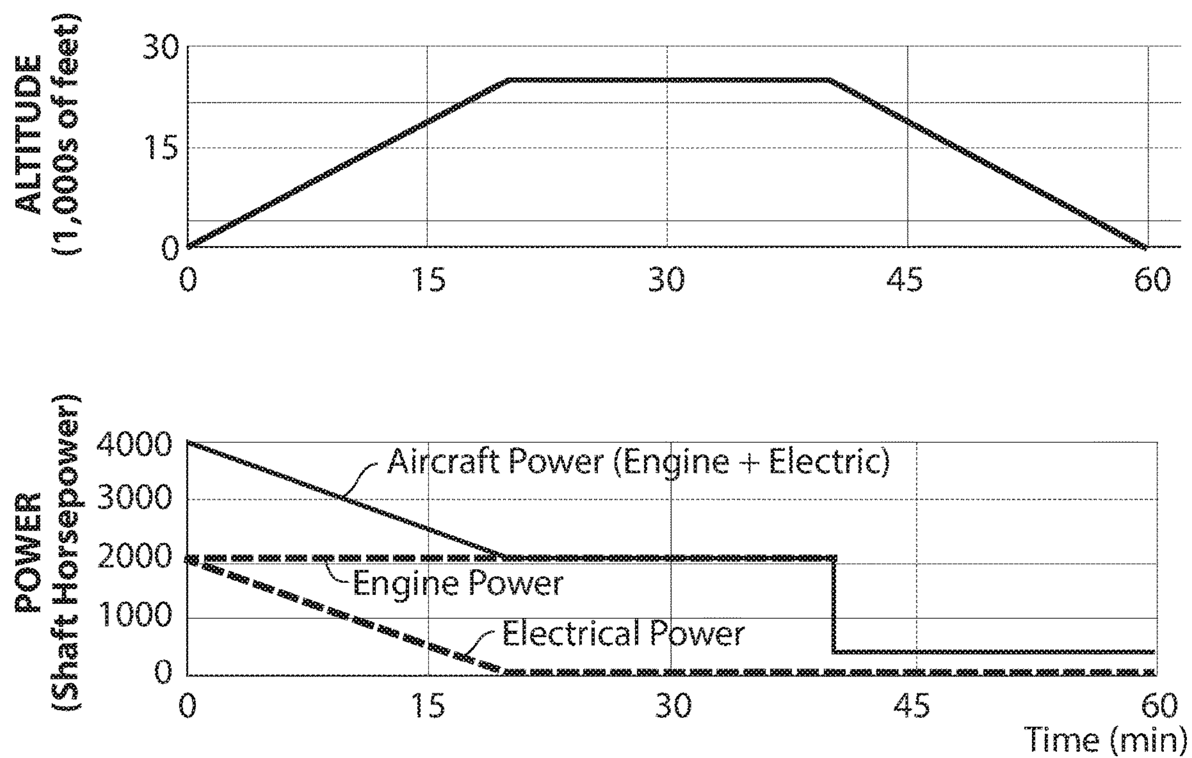
FIG. 3 is a diagram showing an embodiment of a power control scheme relative to flight phase (e.g., altitude) in accordance with this disclosure.

Referring to FIGS. 1 and 2, a hybrid electric aircraft powerplant arrangement 100 can include a first wing pair 101*a* of powerplants for a first wing (e.g., wing 201) of an aircraft (e.g., aircraft 200). The first wing pair 101*a* can include a first electric powerplant 103*a* configured to drive a first air mover 105*a* and a first heat engine powerplant 107*a* configured to drive a second air mover 105*b* separate from the first air mover 105*a*. Any number of wing pairs on each wing of an aircraft is contemplated herein.

The arrangement 100 can include a second wing pair 101*b* of powerplants for a second wing (e.g., wing 203) of the aircraft (e.g., aircraft 200). the second wing pair 101*b* can include a second electric powerplant 103*b* configured to drive a third air mover 105*c* separate from the first and second air movers 105*a*, 105*b*, and a second heat engine powerplant 107*b* configured to drive a fourth air mover 105*d* separate from the first, second, and third air movers 105*a*, 105*b*, 105*c*. Each wing can include any suitable number of electric powerplants and heat engine powerplants (e.g., a wing pair 101*a* and an additional heat engine or electric motor, two wing pairs on each wing, a plurality of wing pairs divided between the wings).

The first and second electric powerplant 103*a*, 103*b* can each include any suitable components (e.g., an electric motor, power electronics). The first and second heat engine powerplants 107*a*, 107*b* can include any suitable components (e.g., one or more heat engines such as a turbomachine or piston engine). The arrangement 100 can include any other suitable components, e.g., one or more liquid fuel storages (e.g., connected together in any suitable manner) and fuel systems (e.g., controlled by a common controller, e.g., as described below) for heat engine fuel and/or one or more electrical energy storages for powering the electric powerplants).

As shown, the first electric powerplant 103*a* can be inboard (e.g., closer to the centerline of the aircraft) of the first heat engine powerplant 107*a*. The second electric powerplant 103*b* can also be inboard of the second heat engine powerplant 107*b*. This can lower torque in the event of a heat engine failure, reducing the amount of needed compensatory control, for example. However, certain embodiments can have one or more of the electric powerplants 103*a*, 103*b* outboard of the heat powerplants 107*a*, 107*b*.

The arrangement 100 can include a common controller 109 configured to operate each of the powerplants 103*a*, 103*b*, 107*a*, 107*b*. In certain embodiments, each powerplant 103*a*, 103*b*, 107*a*, 107*b* can include a local system controller, e.g., as shown, connected to the common controller 109, for example. However, it is contemplated that only the common controller 109 can be connected to each powerplant system directly as needed. The common controller 109 can include any suitable hardware and/or software configured to perform any function disclosed herein.

In certain embodiments, referring additionally to FIG. 3, the first heat engine powerplant 107*a* and the second heat engine powerplant 107*b* can be sized to provide full power from take-off through cruise until descent. In certain embodiments, the common controller 109 can be configured to control the first heat engine powerplant 107*a* and the second heat engine powerplant 107*b* to operate at only full power, idle power, and a single power setting (e.g., a lower power descent setting, e.g., about 20% power) between full power and idle power, for example, e.g., as shown in FIG. 3. Any other suitable number of power settings (e.g., a variety of discrete power settings) between full power and idle power is contemplated herein.

The arrangement 100 can further include the first, second, third, and fourth air movers 105*a, b, c, d*. Each of the air movers 105*a, b, c, d* can be a propeller, for example. Any other type of air mover is contemplated herein (e.g., a fan or any other similar device).

In certain embodiments, the first electric powerplant 103*a* and the second electric powerplant 103*b* can be powered by one or more electrical energy sources 111*a*, 111*b* (e.g., one or more batteries) that are separate from the first and second heat engine powerplants 107*a*, 107*b*. In certain embodiments, the first heat engine powerplant 107*a* and/or the second heat engine powerplant 107*b* can be configured to provide electrical energy to the one or more electrical energy sources 111*a*, 111*b* (e.g., to charge the one or more batteries). In certain embodiments, it is contemplated that the first and second heat engine powerplants may not be connected to provide any electrical power to the electrical energy source.

In accordance with this disclosure, a hybrid electric aircraft 200 can include a first wing 201 and a second wing 203 (e.g., attached to a fuselage). The aircraft 200 can include a first wing pair 101*a* of powerplants, e.g., as described above, attached to the first wing 201, and a second wing pair 101*b* of powerplants, e.g., as described above, attached to the second wing 203 of the aircraft 200. The aircraft 200 can include any other suitable components.

Certain embodiments can include four 1000 HP powerplants instead of two 2000 HP powerplants on other twin engine types of aircraft, for example. Any suitable maximum production by each power plant (e.g., the same or different from each other) is contemplated herein. Certain embodiments provide a parallel hybrid architecture having distributed fuel burning engines and electric motors, each driving dedicated propellers. Embodiments include separate powertrains with separate propellers. As disclosed above, embodiments can include two electric powerplants and two heat engine powerplants symmetrically disposed on an aircraft. Embodiments of electric and heat powerplants may only be connected by a common controller configured to divide power between heat engine power and electric power.

In certain embodiments, heat engine powerplants can be operated continuously at full power throughout the flight, while the electric powerplants would be operated as needed to provide supplemental power (e.g., during takeoff and climb operations).

Embodiments can provide improved fuel economy due to implementation of two optimally sized fuel burning engines to support cruise instead of four gas turbines running at non-optimum conditions. Embodiments can include reasonable battery sizing due to targeted usage of electric powertrain relative to total mission length. Embodiments can be retrofit into existing aircraft configurations.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid electric powerplant arrangement for an aircraft, comprising:

a first wing pair of powerplants for a first wing of the aircraft, the first wing pair comprising a first electric powerplant configured to drive a first air mover and a first heat engine powerplant configured to drive a second air mover separate from the first air mover;

a second wing pair of powerplants for a second wing of the aircraft, the second wing pair comprising a second electric powerplant configured to drive a third air mover separate from the first and second air movers, and a second heat engine powerplant configured to drive a fourth air mover separate from the first, second, and third air movers; and a common controller configured to operate each of the powerplants, wherein the common controller is configured to divide power between heat engine power and electric power;

wherein the first heat engine and the first electric powerplant are each configured to provide power to the aircraft during a takeoff phase and during a climb phase;

wherein the first heat engine is configured to provide power to the aircraft during a cruise phase and a descent phase;

wherein the first electric powerplant is configured to be depowered during the cruise phase and the descent phase.

2. The arrangement of claim 1, wherein the first electric powerplant is inboard of the first heat engine powerplant.

3. The arrangement of claim 2, wherein the second electric powerplant is inboard of the second heat engine powerplant.

4. The arrangement of claim 1, wherein the first heat engine powerplant and the second heat engine powerplant are sized to provide full power from the take-off phase through the cruise phase until the descent phase.

5. The arrangement of claim 4, wherein the common controller is configured to control the first heat engine powerplant and the second heat engine powerplant to operate at only full power, idle power, and a single power setting between full power and idle power.

6. The arrangement of claim 1, further comprising the first, second, third, and fourth air movers.

7. The arrangement of claim 6, wherein each of the air movers is a propeller or fan.

8. The arrangement of claim 1, wherein the first electric powerplant and the second electric powerplant are powered by one or more electrical energy sources that is separate from the first and second heat engine powerplants.

9. The arrangement of claim 1, wherein, during the takeoff phase, the climb phase and the cruise phase, the first heat engine operates at maximum power.

10. The arrangement of claim 1, wherein, during the climb phase, the power provided by the first electric powerplant decreases as aircraft altitude increases.

11. A hybrid electric aircraft, comprising:

a first wing;

a second wing; and a first wing pair of powerplants attached to the first wing, the first wing pair comprising a first electric powerplant configured to drive a first air mover and a first heat engine powerplant configured to drive a second air mover separate from the first air mover;

a second wing pair of powerplants attached to the second wing of the aircraft, the second wing pair comprising a second electric powerplant configured to drive a third air mover separate from the first and second air movers, and a second heat engine powerplant configured to drive a fourth air mover separate from the first, second, and third air movers; and a common controller configured to operate each of the powerplants, wherein the common controller is configured to divide power between heat engine power and electric power;

wherein the first heat engine is configured to provide positive engine shaft power during a takeoff phase and a climb phase, wherein the first electric powerplant provides positive electric power during the takeoff phase and the climb phase;

wherein the first heat engine is configured to provide positive engine shaft power to the aircraft during a cruise phase and a descent phase;

wherein the first electric powerplant is configured to provide zero power to the aircraft during the cruise phase and the descent phase.

12. The aircraft of claim 11, wherein the first electric powerplant is inboard of the first heat engine powerplant.

13. The aircraft of claim 12, wherein the second electric powerplant is inboard of the second heat engine powerplant.

14. The aircraft of claim 11, wherein the first heat engine powerplant and the second heat engine powerplant are sized to provide full power from the take-off phase through the cruise phase until the descent phase.

15. The aircraft of claim 14, wherein the common controller is configured to control the first heat engine powerplant and the second heat engine powerplant to operate at only full power, idle power, and a single power setting between full power and idle power.

16. The aircraft of claim 11, further comprising the first, second, third, and fourth air movers.

17. The aircraft of claim 16, wherein each of the air movers is a propeller or fan.

18. The aircraft of claim 11, wherein the first electric powerplant and the second electric powerplant are powered by one or more electrical energy sources that is separate from the first and second heat engine powerplants.

19. A hybrid electric powerplant arrangement for an aircraft, comprising:

a first wing pair of powerplants for a first wing of the aircraft, the first wing pair comprising a first electric powerplant configured to drive a first air mover and a first heat engine powerplant configured to drive a second air mover separate from the first air mover; and a second wing pair of powerplants for a second wing of the aircraft, the second wing pair comprising a second electric powerplant configured to drive a third air mover separate from the first and second air movers, and a second heat engine powerplant configured to drive a fourth air mover separate from the first, second, and third air movers, wherein the first electric powerplant and the second electric powerplant are powered by a plurality of electrical energy sources that are separate from the first and second heat engine powerplants, and wherein the first electric powerplant is coupled to and is powered by a first electrical energy source of the plurality of electrical energy sources and the second electric powerplant is coupled to and is powered by a second electrical energy source of the plurality of electrical energy sources;

wherein the first electric powerplant and the second electric powerplant are each configured to provide zero power during a descent phase.

20. The arrangement of claim 19, further comprising:

a common controller configured to control the first heat engine powerplant and the second heat engine powerplant to operate at only full power, idle power, and single power setting between full power and idle power;

wherein the first electric powerplant provides zero power to the first air mover; and wherein the second electric powerplant provides zero power to the third air mover.

* * * * *